(12) United States Patent
Sørensen

(10) Patent No.: US 7,053,622 B2
(45) Date of Patent: May 30, 2006

(54) MEASURING EQUIPMENT AND METHOD FOR MAPPING THE GEOLOGY IN AN UNDERGROUND FORMATION

(76) Inventor: Kurt I. Sørensen, Blegindvej 102, Hørning (DK) 8362

( * ) Notice: Subject to any disclaimer, the term of this patent is extended or adjusted under 35 U.S.C. 154(b) by 0 days.

(21) Appl. No.: 11/203,552

(22) Filed: Aug. 12, 2005

(65) Prior Publication Data

US 2006/0015255 A1    Jan. 19, 2006

Related U.S. Application Data

(63) Continuation of application No. PCT/DK2004/000102, filed on Feb. 13, 2004.

(30) Foreign Application Priority Data

Feb. 13, 2003  (DK) ............................... 2003 00222

(51) Int. Cl.
*G01V 3/00* (2006.01)
*G01V 3/08* (2006.01)
*G01V 3/26* (2006.01)

(52) U.S. Cl. ...................................... 324/346; 324/338
(58) Field of Classification Search ..................... None
See application file for complete search history.

(56) References Cited

U.S. PATENT DOCUMENTS

| | | | |
|---|---|---|---|
| 2,642,477 A | 6/1953 | Puranen et al. | 175/182 |
| 3,315,155 A | 4/1967 | Colani | 324/40 |
| 3,835,371 A | 9/1974 | Mirdadian et al. | 324/3 |
| 5,557,206 A | 9/1996 | Won | 324/329 |
| 5,610,523 A | 3/1997 | Elliot | 324/330 |
| 5,796,253 A | 8/1998 | Bosnar et al. | 324/336 |
| 2002/0030492 A1 | 3/2002 | Guo et al. | 324/334 |
| 2003/0016131 A1 | 1/2003 | Nelson | 340/551 |

FOREIGN PATENT DOCUMENTS

| | | |
|---|---|---|
| WO | WO 96/33426 | 10/1996 |
| WO | WO 03/016952 A1 | 2/2003 |

*Primary Examiner*—Bot LeDynh
(74) *Attorney, Agent, or Firm*—Winston & Strawn LLP

(57) ABSTRACT

The invention relates to measuring equipment and method for mapping the geology including a transmitter circuit with a current source for generating an electric current and a transmitter coil; a switch for connecting the current source to the transmitter coil during operation so that an electric current is generated in it, with the current building up a magnetic field in the formation, and for cutting off this current again so that the built-up magnetic field in the formation decays; and a receiving circuit with a receiving coil for registering the voltage induced over the receiving coil. There is a preamplifier for amplifying the registered voltage (VRcoil) from the receiving coil and the second electrical switch for disconnecting the connection between the receiving coil and the preamplifier, a measuring equipment can be provided that is so compact that it can be used for airborne transient sounding.

15 Claims, 14 Drawing Sheets

MEASURING EQUIPMENT AND METHOD FOR MAPPING THE GEOLOGY IN AN UNDERGROUND FORMATION

CROSS-REFERENCE TO RELATED APPLICATION

This application is a continuation of International application PCT/DK2004/000102 filed Feb. 13, 2004, the entire content of which is expressly incorporated herein by reference.

BACKGROUND ART

The invention relates to a measuring equipment and a method for mapping the geology in an underground formation and which comprises at least one transmitter circuit with at least one transmitter coil and a current source, at least one switch inserted between the current source and the at least one transmitter coil and which during operation serves to connect the current source of the at least one transmitter circuit with the at least one transmitter coil to generate an electrical current for building up a magnetic field in the formation and to break the electrical current again to thereby cause the built-up magnetic field in the formation to decay, and at least one receiving circuit with at least one receiving coil to measure the decay signal.

Above mentioned measuring equipment and method, which among people skilled in the art is called transient electromagnetic sounding, have long been known and have widespread use in mineral prospecting and mapping of ground-water resources.

It is also known that portable equipment is used for mapping of ground-water resources. The equipment consists of a transmitter unit with belonging transmitter cable and a receiving unit with belonging receiving coil. On the surface of the ground, the transmitter cable is laid out in a square which forms the transmitter coil with a typical area of 40×40 meters and which is connected to the transmitter unit. The receiving coil is placed in the middle of the transmitter circle (Eng. central loop) or outside the transmitter circle (Eng. offset loop). Certain equipment also uses the transmitter coil as receiving coil (Eng. coincident loop).

Such portable equipment is known from international patent application WO 96/33426, which is disclosed herein as a reference to such known equipment. This portable equipment works by an electrical current being supplied to the transmitter coil from the transmitter unit, which typically has a value of 1–5 amperes. The current is abruptly cut off after a short period of time, typically 5–10 milliseconds, after which the magnetic field built up by the electrical current in the transmitter coil decays. In the receiving coil a voltage is thereby induced which is representative of the decay.

The measuring in the field is typically done along profile lines in such a way that the separate transient electromagnetic soundings are performed with predetermined mutual distances, typically 200–500 meters. Thereby, an estimate of the electrical resistance structure of the formation and thus of the geological formation along the profile lines can be achieved by interpretation of the separate soundings. The interpretation results from the separate line profiles can be grouped through interpolation to a surface covering map or sectional profile of the electrical resistance relations and thus through interpretation of the results to a model of the geological formation in an area.

The transient electromagnetic method is used with great success in mineral exploration since many mineral formations are highly electrically conductive with respect to the mother rock in which they are deposited. Since large areas need to be investigated, instruments for use from fix-wing airplanes have been developed. Thus, measurements in close profile lines can be made and the results can be grouped to surface covering maps over great areas. The decay signal can however not be measured at the early decaying times since it is necessary to use relatively large transmitting currents and airspeeds and for the airplane to fly at an altitude corresponding necessarily to the assignment.

During recent years the transient electromagnetic method has gained a strong footing in mapping of ground-water resources. In order to be able to perform this mapping satisfactorily, it is necessary to use instruments which can measure the decay signal at decay times from a few microseconds to 5–10 milliseconds. Contrary to the instrument used in aviation measurement, the decay signal can be measured in the time interval from a few microseconds after the transmitter current has been cut off to 5–10 milliseconds with instruments for use on the ground surface. As mentioned instruments with high transmission currents are used for aviation measurements, which means that the current in the transmitter coil will decay slowly after the current supply has been cut off in form of a so called cut-off current. Thus the measuring of the decay signal at early decay times will be influenced by the cut-off current in the transmitter coil and be unusable for use in an interpretation. Similarly, the size of the decay signal highly depends on the distance between the transmitter and receiving coils and their distances to the ground surface. Finally, the transmitter coil encircles the plane and thereby induces eddy currents herein. The receiving coil registers the thereby formed magnetic field.

It is very difficult to compensate or correct precisely enough for these influences. During mineral exploration, these influences are without importance since the measured decay signal has an accuracy that can provide the necessary indications of the presence of conductive mineral deposits. The instruments can however not be used for mapping of ground-water resources since in these cases, it is necessary to acquire a considerably more detailed and accurate knowledge of the decay signal at both late and early decay times.

It has therefore been the common conception that transient electromagnetic sounding for use in mapping of ground-water resources had to be performed with portable equipment for use on the ground surface. In mapping of ground-water resources, it is however often large areas that have to be covered in order to obtain the regional understanding and insight of the ground-water aquifer connections and structures. This means that at such investigations, a large number of soundings have to be performed in order to be able to construct a map of the geological structures.

The work herewith is extensive and is not carried out in most cases because of the associated financial costs, and this in spite of the fact that experience has shown that the transient electromagnetic method can give a detailed picture of the geological structure of the underground. A picture that is necessary in Denmark and other countries is necessary to be able to make optimal planning of the use of the gradually more sparse water resources. Because of crops in the fields and soft ground especially in the spring and autumn seasons there are furthermore long periods of time when it is not possible to conduct sounding in the fields.

There is therefore a great need for a compact measuring equipment which can perform the same measurements with the same data quality of the late and early decay times, which until now have been carried out on the ground surface, while at the same time being capable of being transported in the air by e.g. a helicopter. In international patent application WO 96/33426, fundamental transient-sounding is further described and how an improvement of the measurement results can be obtained by transmitting magnetic moments in chronological order. Even though this method is effective and reliable, it is not optimal for e.g. airborne transient sounding where the mechanical construction, such as size and reduction of coupling between transmitter and receiver, is very important. The present invention solves these problems and thereby provides a considerably improved system which is well suited for airborne transient sounding.

In U.S. Pat. No. 3,835,371 a technique is described for measuring the presence of electrically conductive objects on the seabed by a transmitter coil which is dragged through the water. When the transmitter coil is dragged above an electrically conductive object in the water, eddy currents will be induced in the object. These eddy currents form a secondary field which is measured by a receiving coil located in the immediate vicinity of the transmitter coil. By placing the transmitter coil and the receiving coil perpendicular to each other, the flux from the transmitter coil through the receiving coil is minimized, and even weak secondary fields can thereby be measured without interference from the transmitted magnetic field of the transmitter coil.

Since it is the response of the soil and its characteristics that are interesting at transient sounding, the receiving coil must necessarily have the same planar orientation as the transmitter coil. The technique known from the above U.S. Pat. No. 3,835,371, which operates with coils that are perpendicular to each other, is close to useless for transient sounding which works with parallel coils.

U.S. Pat. No. 5,557,206 describes another system for transient sounding. In this case, two concentric coils, one having a larger diameter than the other, are used to measure responses from the geological formation. The two coils are serially connected in such a way that they obtain opposite current directions. The field strength in the middle of the coil can be minimized or reduced to zero by adjusting the coils number of turns and area.

The strength of the coils' far field is however not minimal or zero since this strength depends on the area of the coils multiplied by number of turns of each coil and the current. The far field can be used for measuring a geological deposit by induction of a field which can be measured in a receiving coil placed in the middle of the transmitter coils. This solution cannot be used, however, for measurement of earth responses from transient fields which are obtained by a quick cut-off of the current.

When the current in the two transmitter coils, which is used in measuring method known from U.S. Pat. No. 5,557,206, is cut off, the cut-off time depends on the uneven self-induction and self capacity of the coils. The cut-off time in the two coils is thus not identical, resulting in the generated magnetic fields being unable to even out each other in the middle of the coils. Measurement of the response from the ground structure will thus be distorted by the interference from the cut-off current in the transmitter coils.

In US patent application no. US 2003/0016131 A1 a measuring arrangement is described which operates with a transmitter coil with many closely placed wires. By building the transmitter coil in this way, a uniform induction field is obtained, which provides a uniform induction in objects in the ground. The response from these objects can thus easily be recognized. The purpose with this arrangement is to detect defined objects such as cables, pipes and unexploded mines in the ground and not geological deposits. Noise from other sources such as the earth response is eliminated by using two or more receiving coils.

Accordingly, there is a need for improved devices and these are now provided by the present invention.

SUMMARY OF THE INVENTION

In a first aspect according to the invention, measuring equipment of the kind mentioned in the opening paragraph is provided, wherein the harmonic distortion is minimal.

In a second aspect according to the invention, measuring equipment of the kind mentioned in the opening paragraph is provided, wherein the measuring equipment is more compact than hitherto known.

In a third aspect according to the invention a measuring equipment of the kind mentioned in the opening paragraph is provided, wherein the measuring equipment can be airborne.

In a fourth aspect according to the invention a measuring equipment of the kind mentioned in the opening paragraph is provided, wherein distortion from leakage currents in the transmitter coil is minimal.

According to the invention the at least one receiving coil of the measuring equipment is placed in an area where the induction in the receiving coil from currents in the transmitter coil is zero or minimal. When the plane of the receiving coil is placed on the tangent plane to the magnetic field lines in mentioned area and the plane of the transmitter coil is parallel to the plane of the receiving coil, it is obtained that currents in the transmitter coil only will be capable of inducing a voltage in the receiving coil to a very small degree. Thereby, it is advantageously obtained that the harmonic distortions in the receiver from the strong, induced voltages in the receiving coil during the decay of the cut-off currents are damped considerably. This leads to the advantage that the measurement of the decay is not influenced to any appreciable degree.

Another advantage is that the leakage currents in the transmitter coil do not influence the measurement of the decay signal to any appreciable degree. To obtain same magnetic moment and still be able to measure a decay signal which is not influenced to any appreciable degree by the harmonic distortion or by leakage currents in the transmitter coil, the area of the transmitter coil according to the invention can moreover be reduced simultaneously with the increasing of the current. This advantageously allows the transmitter coil to be airborne.

Measuring equipment according to the invention can comprise at least one preamplifier to amplify the registered voltage from the receiving coil, whereby the noise from the surroundings will influence the measurements in the receiving circuit to lesser degree. Between the receiving coil and the preamplifier, an electrical switch can advantageously be placed for cutting off the connection between the receiving coil and the preamplifier. By not letting the switch couple the preamplifier, until the powerful signals that arise from the transmitted moment of the transmitter coil have decreased substantially, it is advantageously obtained that the harmonic distortions are dampened considerably.

By placing several transmitter coils each controlled by its own transmitter above the structure, a total large magnetic moment can advantageously be transmitted simultaneously with the transmitting current in each single transmitter coil relatively quick can be cut off. Also, by placing the transmitter coils closely above each other on the same plane, it is advantageously obtained that they perform as one transmitter coil and thus total have an area which has a common tangent on the same plane as the transmitter coils. By closely above each other, it should in this context be understood that the transmitter coils in their entirety are placed closely above each other or that their turns are placed closely above each other.

Furthermore the number of turns in the separate coils can be changed for thereby obtaining different magnetic moments and turn off time for the transmitting currents. The at least one transmitter coil of the measuring equipment can according to the invention be arranged to also transmit magnetic moments of different sizes, whereby different decaying times can be measured. In an advantageous embodiment the wire of the transmitter coil can consist of a number of electrically insulated cores. Thereby the thick thread effect which is created at large currents and which could interfere with the measurements to a considerable degree is eliminated.

According to the invention the size of the transmitter coil of the measuring equipment can advantageously be reduced from e.g. 40×40 meter of the known transmitter coil to, for example, a compact transmitter coil of 10×10 meters. When laying out on the ground, it is advantageously obtained that the compact transmitter coil according to the invention can be transported and laid out far easier than the large transmitter coils conventionally used. In the compact transmitter coil it will be possible to transmit large moments as in the conventionally used large transmitter coils whereby noise from the surroundings will interfere with the measurements to a lesser degree.

Contrary to the large transmitter coils, the compact transmitter coils according to the invention can furthermore be carried over the terrain by for example a helicopter or a balloon, whereby even impenetrable terrain can be measured quicker and easier than hitherto known. For this purpose, the transmitter coils can be mounted on a suited frame.

BRIEF DESCRIPTION OF THE DRAWINGS

The invention is described in more detail below, describing only exemplary embodiments with reference to the drawing, in which.

DETAILED DESCRIPTION OF PREFERRED EMBODIMENTS

Figure 1:
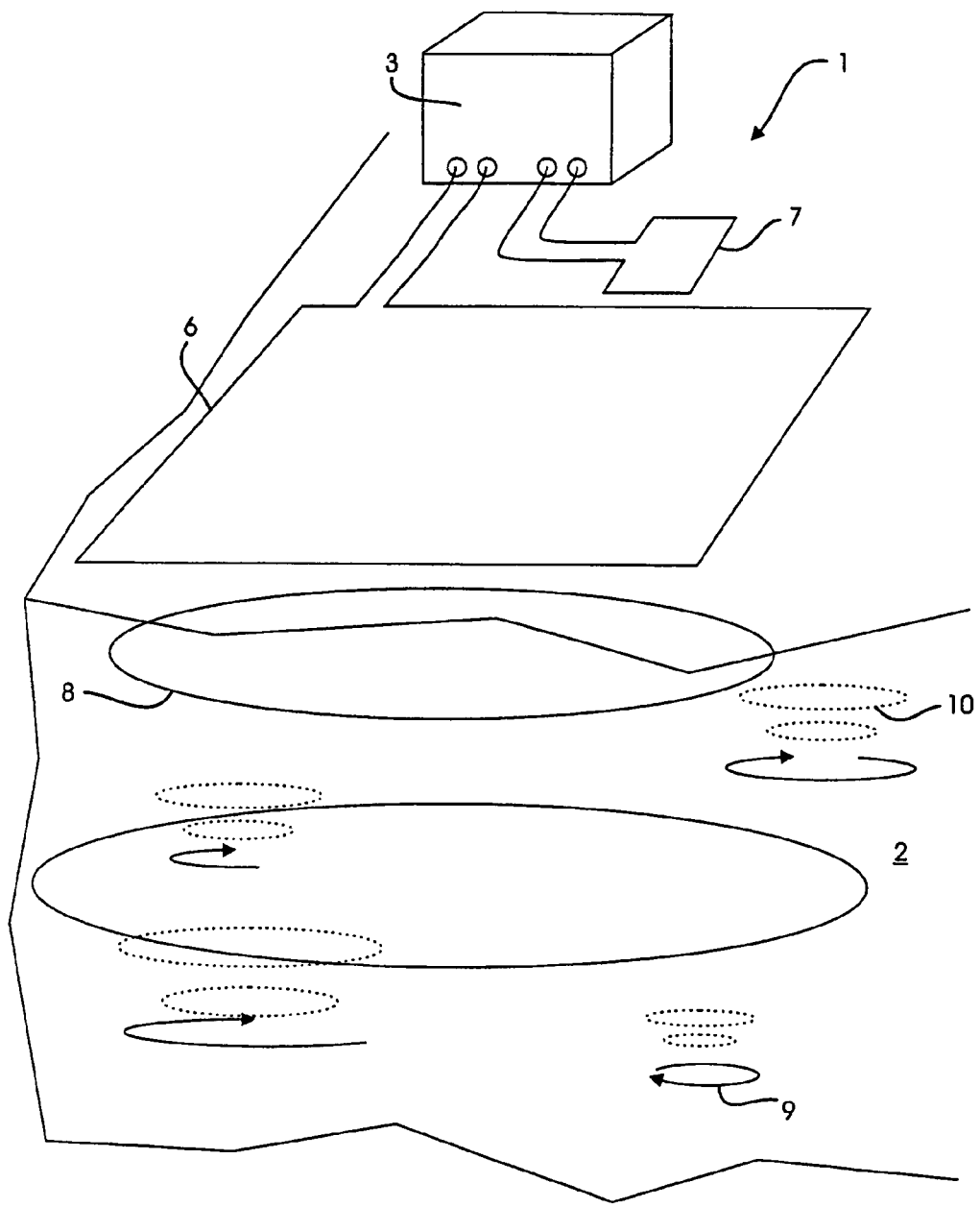
FIG. 1 is a diagrammatic view of measuring equipment according to the invention in operation above a structure.

FIG. 1 shows measuring equipment 1 for mapping the geology in an underground formation 2. The measuring equipment comprises a cabinet 3 with a part of a transmitter circuit 4 and a receiving circuit 5 (shown in FIGS. 2, 3 and 4). A transmitter coil 6 belonging to the transmitter circuit and a receiving coil 7 belonging to the receiving circuit are placed outside the cabinet.

When a transmitting current $I_T$ is transmitted through the transmitter coil 6, a primary magnetic field is built up in the formation 2. By subsequently cutting off the current, the magnetic field will decay whereby eddy currents are formed in the formation, which build up a secondary magnetic field 10 which induces an electrical current in the receiving coil 7. The primary magnetic field, which still exists until the current in the transmitter coil has decreased to zero, simultaneously induces an electrical current in the receiving coil 7.

This current is registered as a receiving voltage over the receiving coil. The part of the receiving voltage which represents the secondary magnetic field is typically called the ground response or the decay signal.

The decay signal is analyzed by e.g. a computer (not shown), which preferably is placed in the cabinet and which interprets the structure of the formation on basis of said ground response.

This analysis is typically done with an iterative comparison between the decay signal and a mathematical model stored in the computer. By iteratively adapting the mathematical model, an identifiable representation of the formation can be provided.

These decay signals are often very complex and by a mere human estimate of them, only a general estimate of the composition of the formation can be given. Thereby a decay signal which has a large amplitude at the early decay times and thereafter decreases abruptly can for example generally be said to represent a formation which has a good electrically conductive composition in the top layer since this will provide a strong response and an insulating composition in the lower layers since the later decay times will provide a weak response because these layers are unable to build up particularly large eddy currents.

Figure 2:
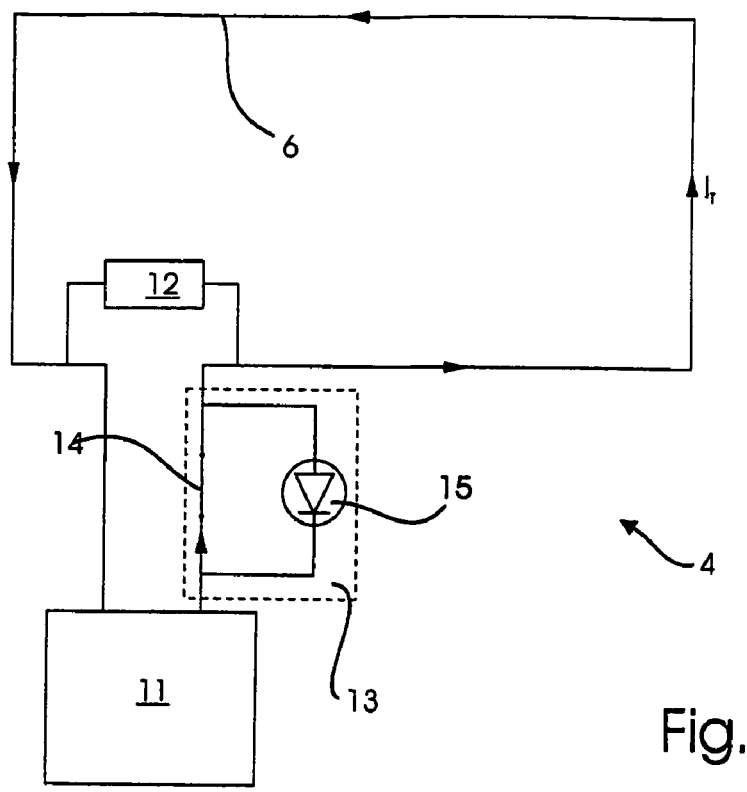
FIG. 2 is a diagram of a transmitter circuit with a transmitter coil in a state connected to the measuring equipment shown in FIG. 1.
Figure 3:
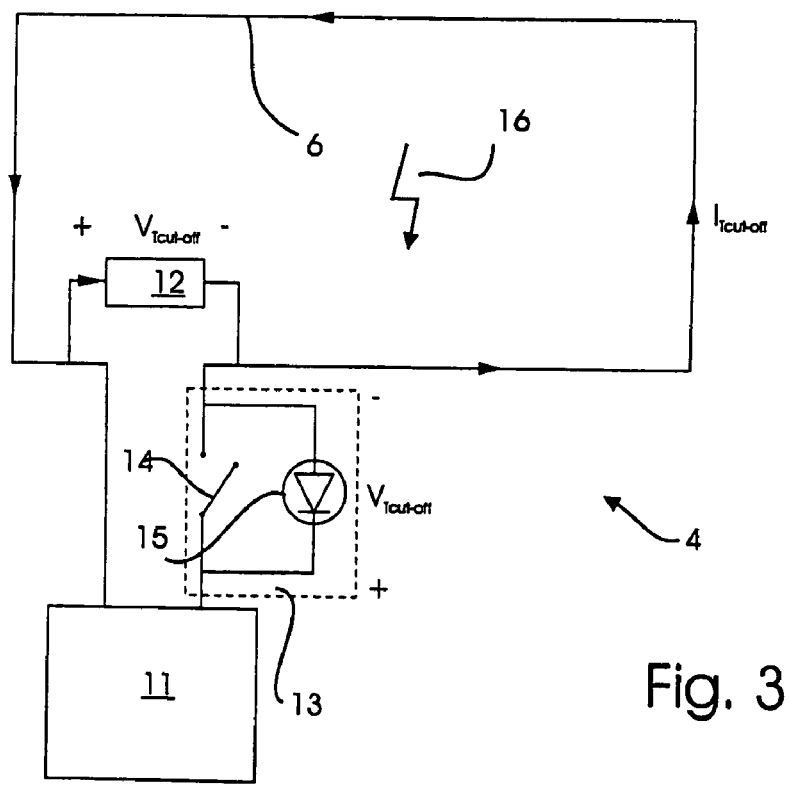
FIG. 3 shows same diagram in disconnected state.

FIGS. 2 and 3 are diagrams of the transmitter circuit 4. In FIG. 2 the transmitting circuit is connected and in FIG. 3 it is disconnected.

The transmitter circuit 4 comprises a transmitting unit 11 for generating a desired signal in form of a transmitting current $I_T$ in the transmitter coil 6, which has a self-induction $L_{coil}$. The transmitter coil is shunted with a dampening resistor 12.

Between the transmitting unit 11 and the transmitter coil 6, a breaker 13 with a switch 14 and a protection diode 15 are inserted. Such a breaker can be built up of many different components but will typically be a MOSFET transistor with an avalanche diode. MOSFET transistors, which also are called switch transistors, have the ability of being able to assume either conductive or insulating states whereby the desired break function is obtained by switching between these two states. The avalanche diode of the MOSFET protects the transistor from "burning" out at too high voltages. In known MOSFET transistors such avalanche diode typically make sure that the voltage over the transistor does not exceed 600 Volt, which also is known as the avalanche voltage.

The transmitting area of the transmitter coil can for example be 10×10 meters and have one to four turns depending on the desired transmitted magnetic moment 16.

The magnetic moment 16 is defined as $I_T * A_{transmitter} * n$, where $I_t$ is the transmitting current, $A_{transmitter}$ is the area of the transmitter coil, and n is the number of turns in the transmitter coil.

A transmitting current of 50 ampere in four turns can for example generate a large magnetic moment and a transmitting current of 20–30 ampere in one to two turns can for example generate a low moment.

Different magnetic moments are used to measure different parts of the decay signal. The decay signal is directly proportional to the transmitted moment. Since the signal level of the decay signal is high at early times a lower moment than at measurement of late decay times can be used here. The low moment can be turned of considerably faster than the high moment since the self-induction of the associated transmitter coil is smaller and it is thus easier to measure the decay signal at early times with low magnetic moments without the signal being influenced by the decay of the cut-off currents.

The decay times, which are desired measured upon emission of above-mentioned magnetic moment, are typically within a time interval from 10 microseconds to 10 milliseconds.

The decay in other time intervals can however also advantageously be measured by use of the measuring equipment according to the invention, as the transmitted moments then have to be adapted thereto.

Figure 4:
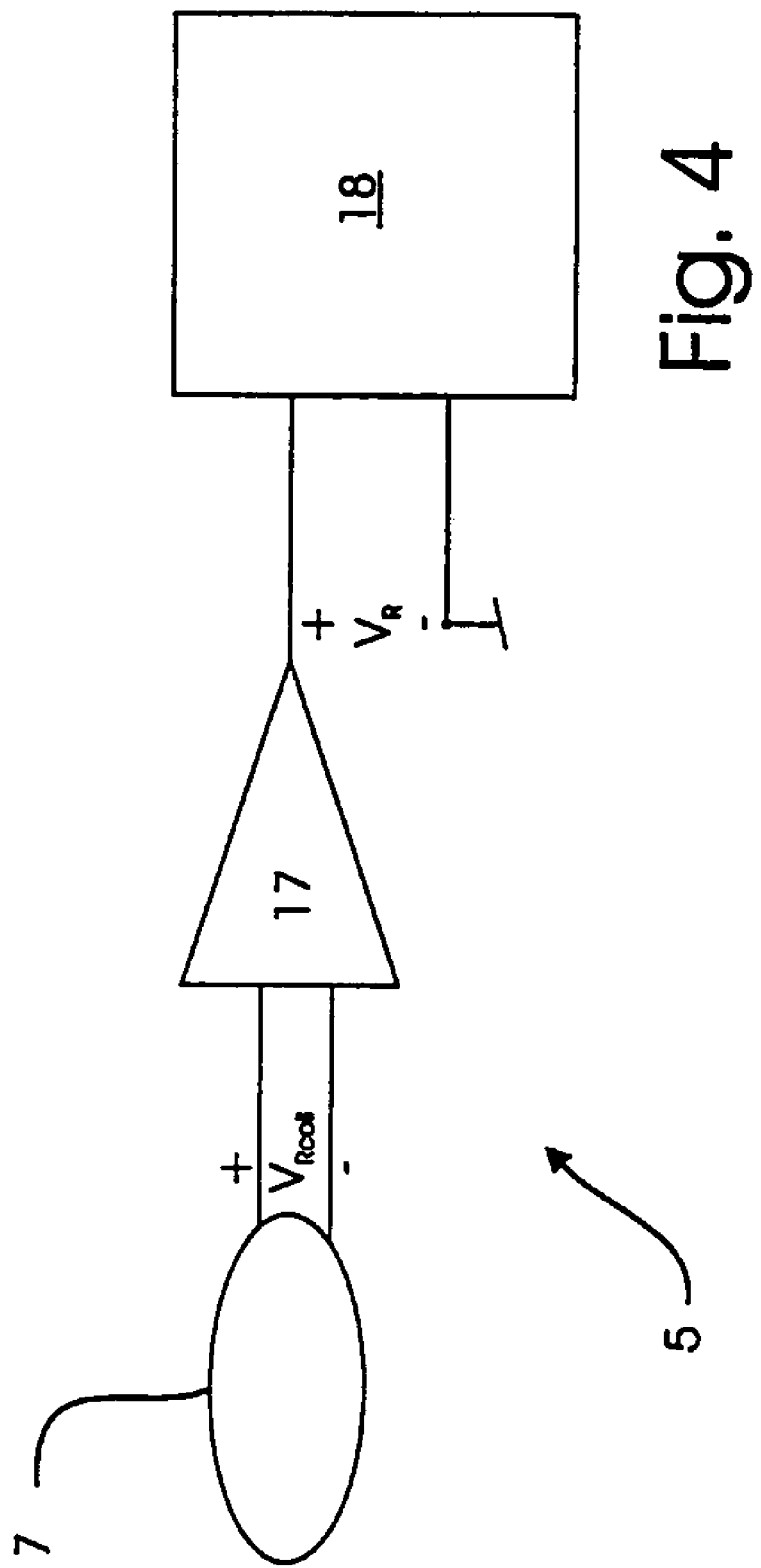
FIG. 4 is a diagram of a receiving circuit with a receiving coil for the measuring equipment shown in FIG. 1.

FIG. 4 shows the receiving circuit 5 for registering of decay signal. The receiver consists of receiving coil 7, a preamplifier 17 for the receiving coil and a receiving unit 18 to receive and further process and/or analyze the received decay signal.

The receiving area $A_{receiver}$ of the receiving coil is typically about 50×50 cm with 2×10 turns. The preamplifier 17 of the receiving coil can for example differentially amplify about 60 times, have a low output impedance and be close to the receiving coil, since the receiving unit 18 is placed in considerable distance from the preamplifier, for example 10 meters, which is why a strongly driven signal is required through the cable in order to avoid the signal being distorted by surrounding noise.

Figure 5:
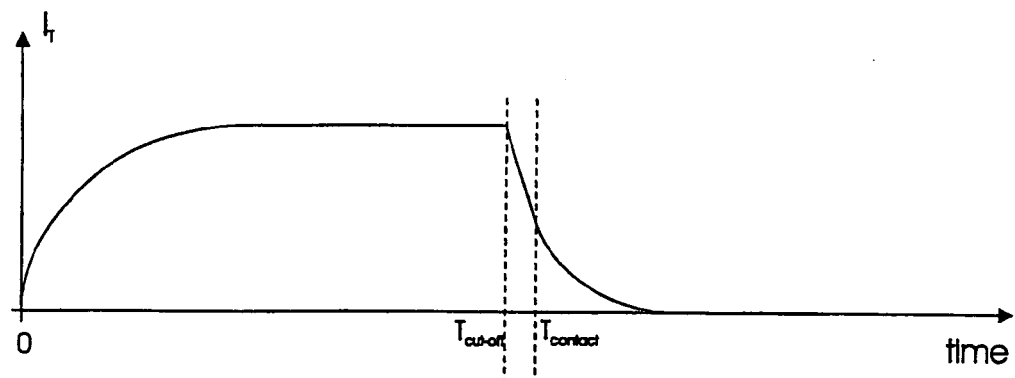
FIG. 5 shows the current of the transmitting circuit shown in FIGS. 2 and 3 as a function of time.

FIG. 5 shows graphically the transmitting current $I_T$, which is applied in FIG. 2 as a function of time. As it appears an up slope of the current $I_T$ is taking place in the interval 0 to $t_{cut-off}$. Thereafter the transmitting current is cut off, as shown in FIG. 3, by the breaker 13 at the time $t_{cut-off}$, after which a large cut-off voltage $V_{Tcut-off}$ is immediately created in the transmitter coil 6.

Theoretically, this cut-off voltage will be determined by the transmitting current $I_{Tcut-off}$ after the time $t_{cut-off}$ and the dampening resistor 12, which for example can assume the values $I_{Tcut-off}$=50 A at the time $t_{cut-off}$ and a dampening resistance of 600 ohm whereby a cut-off voltage of 30 Kvolt will occur.

In practice, this will however not occur since the avalanche diode of the transistor will reduce the cut-off voltage to the avalanche voltage, which typically will be 600 Volt.

As long as the transmitter coil can maintain a cut-off voltage that exceeds the avalanche voltage ($V_{Tcut-off}$>600 Volt), the current $I_{Tcut-off}$ in the transmitter coil will, during cut-off, ideally follow the differential equation $dI/dt=-(V_{cut-off})/(L_{coil})$ and have a constantly decreasing decay since the cut-off voltage is determined by the constant avalanche voltage and the self-induction of the transmitter coil, which also is constant. This is seen on the linearly decreasing decay of the currents curve between the two times $t_{cut-off}$ and $t_{contact}$.

When the cut-off voltage falls below the avalanche voltage ($V_{Tcut-off}$<600 Volt), the avalanche diode $D_T$ will block and no current will pass through the switch transistor $T_{switch}$. After the time $t_{contact}$ the transmitting current $I_{Tcut-off}$ will decrease exponentially along the differential equation $dI/dt=-(I_{Tcut-off}) \times (R_T)/(L_{coil})$, which means that the current decreases proportionally with $\exp(-(R_T)/(L_{coil}) \times (t_{exp}))$, where $t_{exp}$ is the time measured in seconds from the beginning of the exponential decay ($t_{exp}=t-t_{contact}$) until the current dies out.

Figure 6:
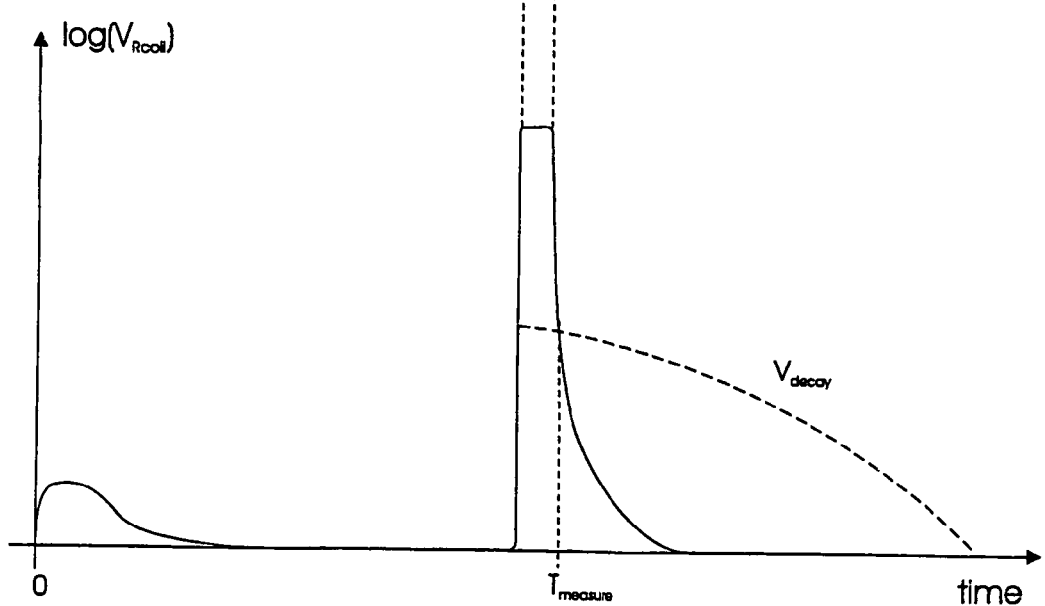
FIG. 6 shows the voltage over the receiving coil shown in FIG. 4 as a function of time.

FIG. 6 graphically shows the generated voltage $V_{Rcoil}$ in the receiving coil as a result of the direct coupling between the transmitting circuit 4 and the receiving circuit 5.

Immediately after the time 0, a small rise in the voltage $V_{upslope}$ is seen as a result of the up slope of the transmitter current in the transmitter coil. It does however die out as the change in the transmitter current becomes smaller. At the time $t_{cut-off}$ the generated voltage over the receiving coil rises rapidly and then remains constant in a time period until the time $t_{contact}$, which corresponds to the avalanche sequence where the change is constant, after which the voltage decreases exponentially.

As shown in FIG. 6 the desired decay signal $V_{decay}$, which is shown with the decreasing dotted line, is obtained when the transmitting current in the transmitter coil is turned off at the time $t_{cut-off}$. There are however several problems connected to measuring this decay signal $V_{decay}$, as the voltage, which is obtained due to the coupling from the transmitter circuit, wholly or partly drowns the decay signal.

Figure 7A:
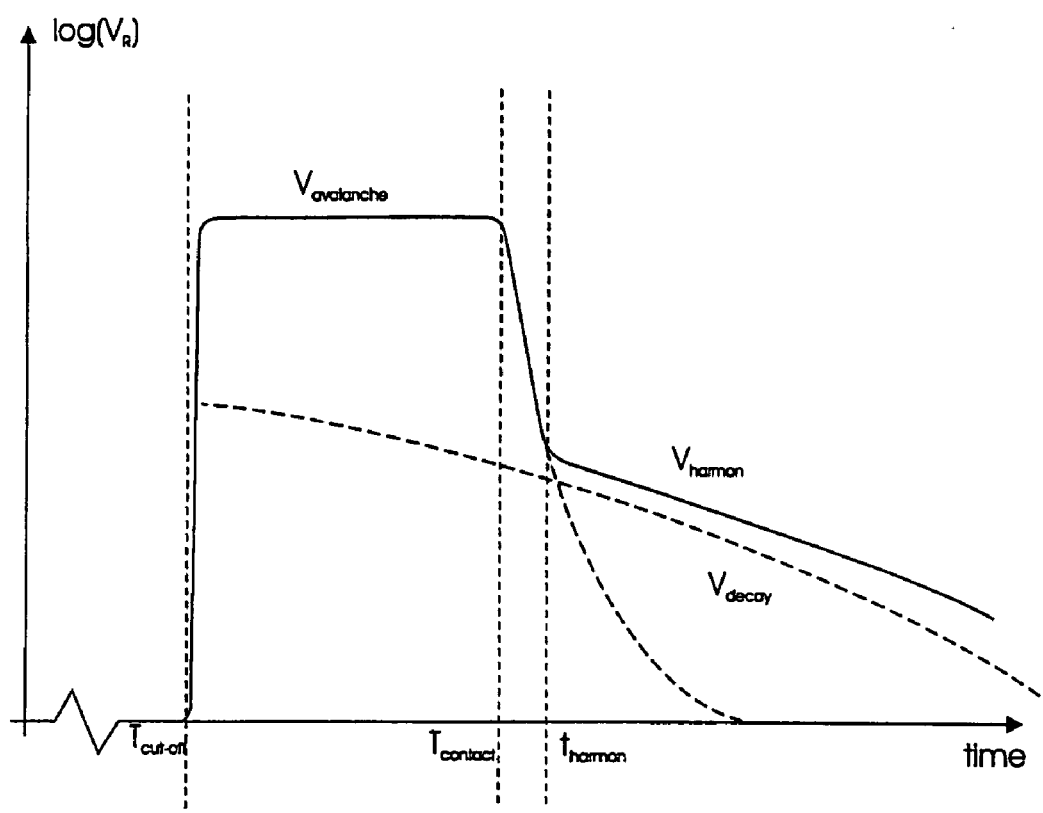
FIG. 7a is a diagram showing a harmonic distortion as measured in the receiving circuit shown in FIG. 4.

One of these problems is that the strong and relative long constant voltage $V_{avalanche}$ which exists over the receiving coil and which originates from the avalanche sequence which, at the cut-off of the transmitting current $I_T$, is led into the preamplifier of the receiving coil. As a consequence thereof and as it is shown in FIG. 7a, harmonic distortion $V_{harmon}$ is created at the time $t_{harmon}$ in the preamplifier of the receiving coil.

This distortion is revealed after the constant voltage $V_{avalanche}$ as a result of the avalanche sequence and breaks out, as shown at about 120 to 140 dB, below this. A larger dampening of the harmonic distortion is not possible at present by means of known amplifiers since these do not have a better dampening of the distortion than 140 dB.

Since the decay signal is about 120 dB below the avalanche sequence and in time decreases quicker than the harmonic distortion, the harmonic distortion can often completely drown out the decay signal or parts thereof at the late decay times and thereby prevent a measurement of this.

This harmonic distortion has earlier caused problems at such measurements especially if the receiving coil was placed inside the transmitter coil which typically was a standard configuration of known measurement arrangements. The problem has however been that the magnetic field is large in the middle of the transmitter coil and has a strong vertical component which leads to the harmonic distortion in the preamplifier of the receiving coil.

Another problem with the known technique is that, when cutting off the coils, a small current, leakage current, will still run therein because of components in the circuit that are not ideal. Since leakage current decreases slowly, the measurements are especially disturbed by the decay signal in the last time period of a series of measurements.

Since leakage currents cannot be avoided, attempts have earlier been made to compensate for them by means of calibration measurements at high altitudes where there is no ambient noise and secondary fields from geological formations and simply subtract the result of the calibration measurement from the result of the measurement of a geological formation.

This method for compensation of leakage currents is however not optimal since it cannot be expected that leakage currents are constant and have same strength at measurements close to the surface of the ground where the production measurements are carried out as at calibration measurements at high altitudes. Measurements of the decay signal close to the surface of the ground compensated by measurements of leakage currents at high altitudes are thus often vitiated by considerable errors.

Figure 7B:
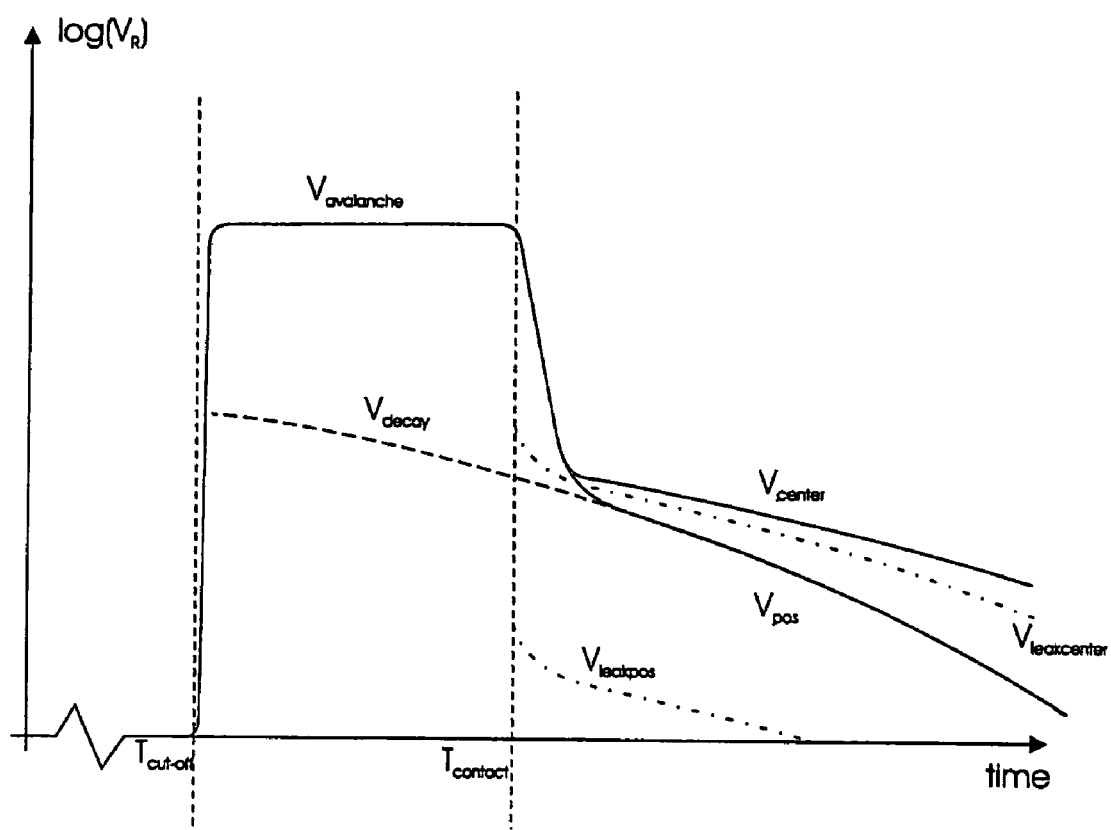
FIG. 7b is a diagram showing a distortion caused by leakage currents in the transmitter coil.

FIG. 7b graphically illustrates the measurements which are obtained when the receiving coil is placed in the middle of the transmitter coil $V_{center}$ where the induction from the leakage currents $V_{leakcenter}$ is strong, and when the receiving coil is placed in a position $V_{pos}$ where the induction from the leakage current $V_{leak}$ is minimal.

As it is shown, the distortion of the resulting measurement $V_{center}$ is high when the receiving coil is in the middle of the transmitter coil, but minimal when the receiving coil is in an area with minimal induction from the leakage currents.

Figure 8:
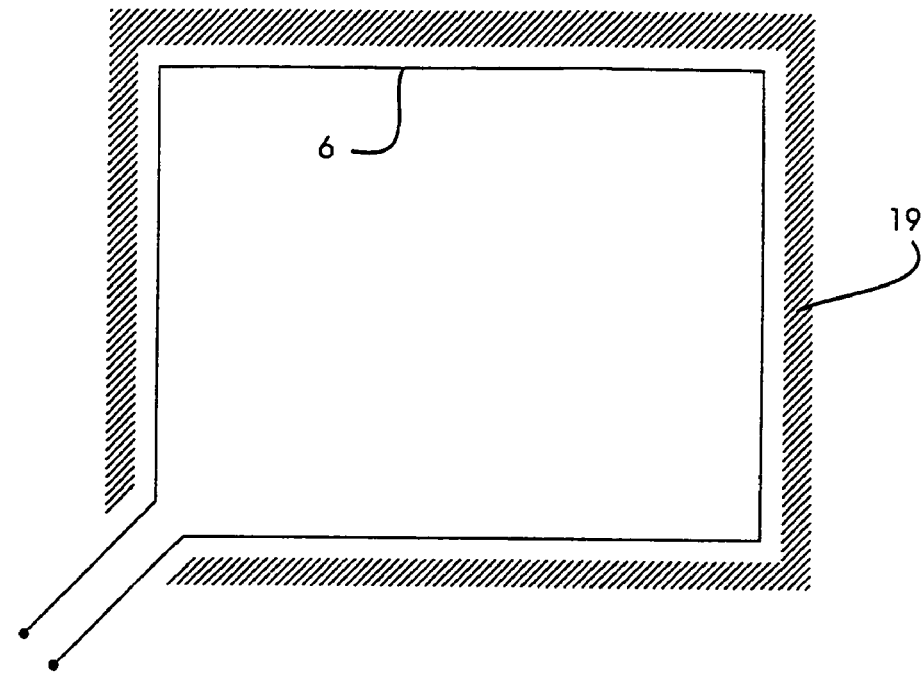
FIG. 8 is a planar view showing an area around the transmitter coil shown in FIGS. 2 and 3 where the magnetic field strength from the transmitter coil is zero or small.
Figure 9:
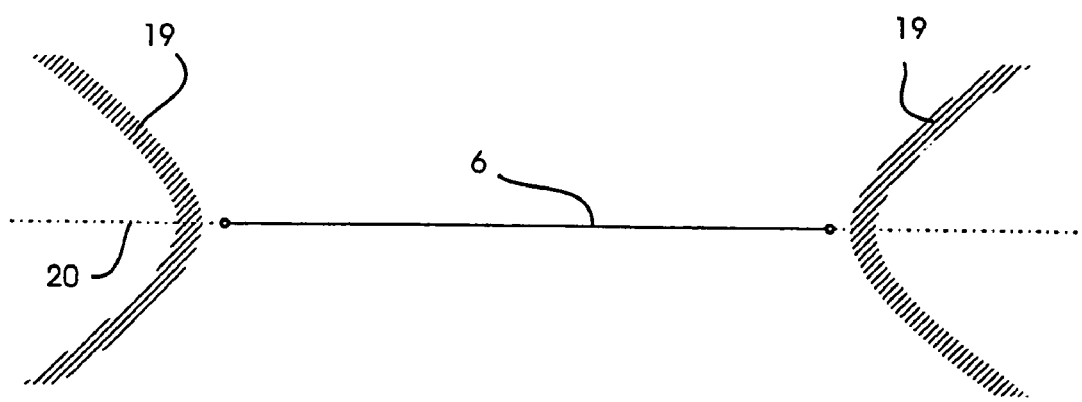
FIG. 9 shows the same seen from the side of the transmitter coil.
Figure 10A:
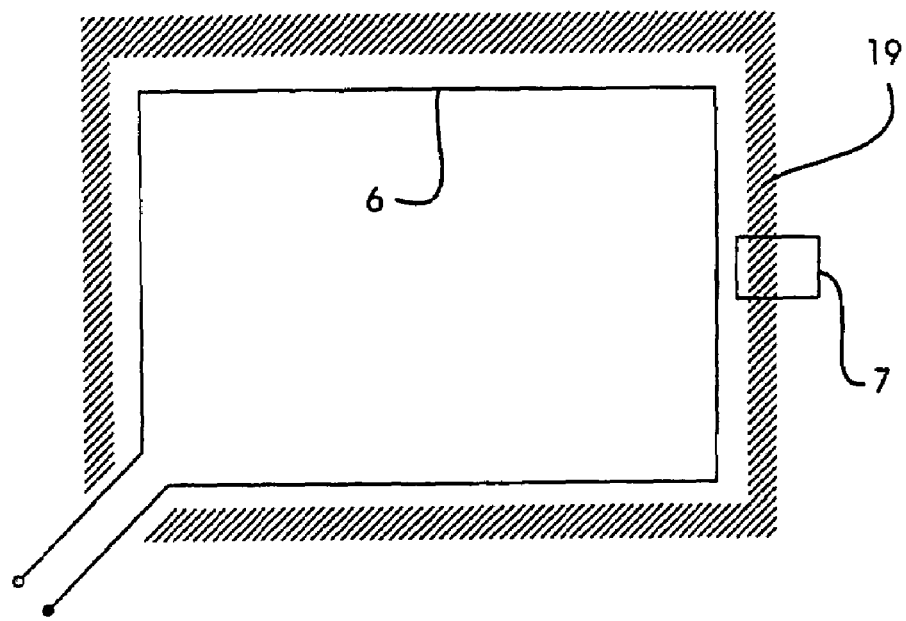
FIG. 10a is a planar view of the receiving coil shown in FIG. 4 placed in the area shown in FIG. 8 with zero or little field strength.
Figure 10B:
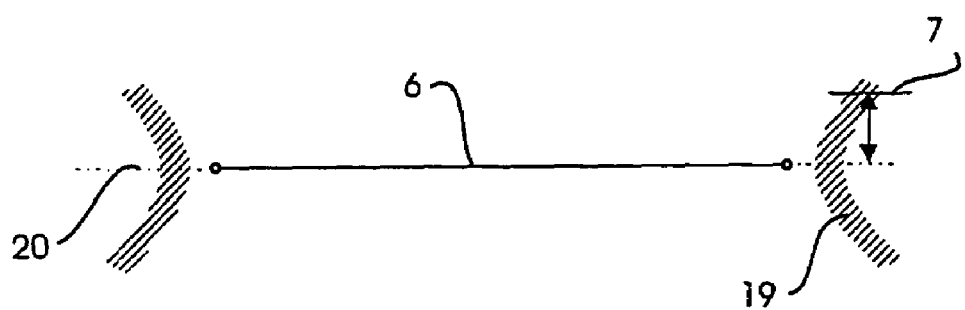
FIG. 10b shows the same seen from the side of the transmitter coil.
Figure 10C:
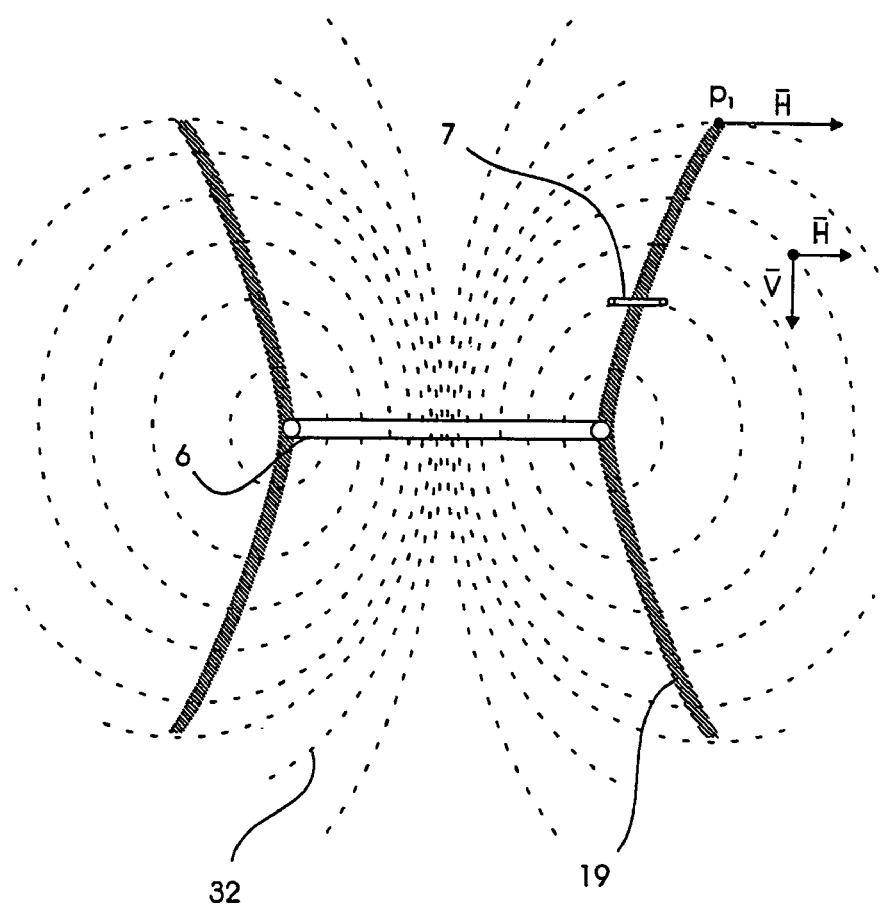
FIG. 10c shows the same where the magnetic field has horizontal tangent.

FIGS. 8, 9 and 10a,b,c show that there is a hatched area 19 outside of the transmitter coil, in which the vertical component $\overline{V}$ from the magnetic field, shown with dotted field lines 32, generated by a horizontally placed transmitter coil, is zero or minimal. This causes the magnetic field in this area, which in the following is called zero area, to only have a horizontal component $\overline{H}$.

By placing the receiving coil in the zero area with the plane oriented in the horizontal plane defined by said horizontal component, i.e. parallel to the transmitter coil, it is obtained that the magnetic induction from currents in the transmitter coil becomes minimal and that the harmonic distortion in the preamplifier of the receiving coil thus also becomes minimal.

A further advantage in placing the receiving coil in the above-mentioned way is that the induction in the receiving coil from the magnetic field which originates from leakage currents in the transmitter coil becomes minimal. Thus the distortion of the decay signal measured in the receiving coil will also be minimal. Even though leakage currents are present during the whole measuring interval, the mentioned technique allows the decay signal to be measured undisturbed by these.

As shown in FIG. 9, the zero area is further away from the transmitter coil measured in the plane 20 of the transmitter coil the greater the distance is above or below the plane of the transmitter coil.

The voltage induced in the receiving coil will furthermore have relatively large differential changes the closer the receiving coil is placed to the horizontal plane of the transmitter coil compared to the differential changes in the induced voltage if the receiving coil is placed horizontally in the zero area at a distance from the plane of the transmitter coil.

As shown especially in FIGS. 10a,b and 11a,b, it is thus possible to place the receiving coil in a large number of positions relative to the transmitter coil depending on the embodiment of the frame which carries the transmitter coil. In both cases, the receiving coil is placed horizontally in the zero area at a distance from the horizontal plane of the transmitter coil.

Figure 11A:
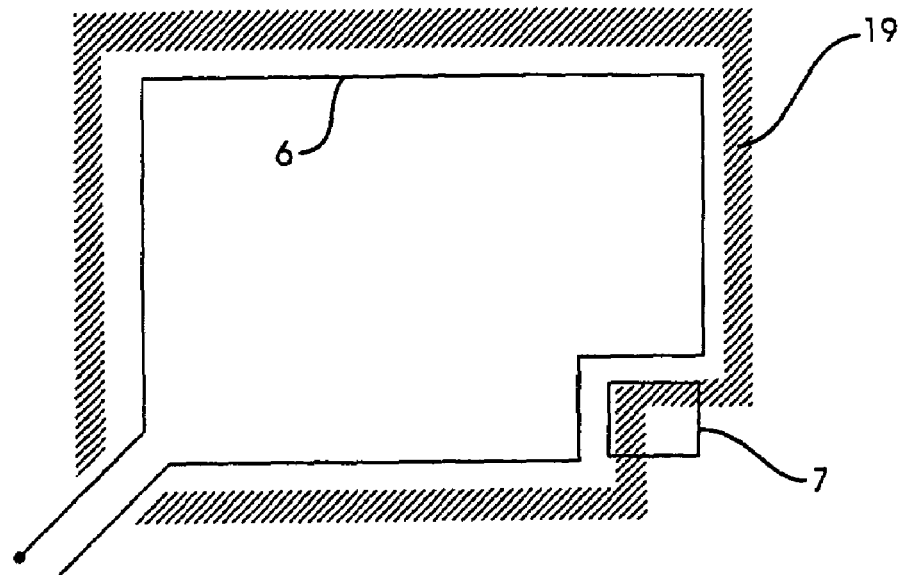
FIG. 11a is a planar view of the receiving coil shown in FIG. 4 placed in an area where the field strength is zero or little around a second embodiment of the transmitter coil.
Figure 11B:
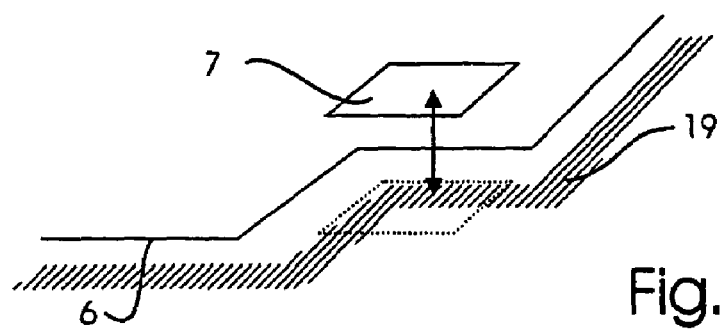
FIG. 11b shows the same seen in perspective.

In the embodiment shown in FIG. 11a,b, the transmitter coil, when placed horizontally, is further formed in such a way that an incised corner is formed with a zero area for convenient placement of a horizontally placed receiving coil.

Figure 12:
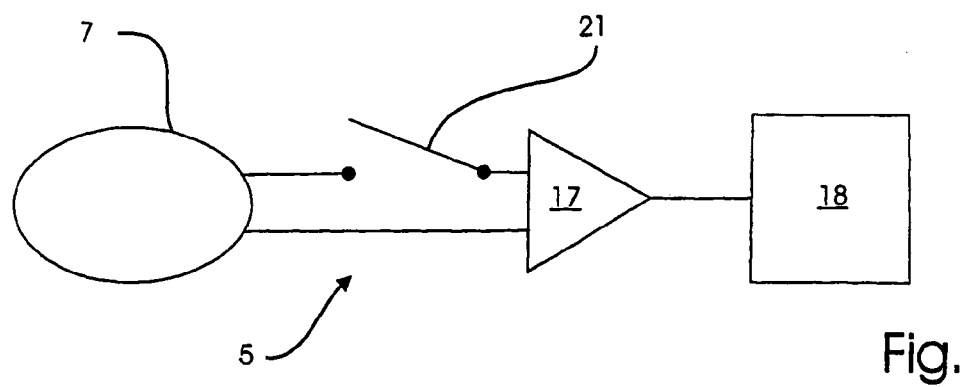
FIG. 12 is a diagram of a second embodiment of a receiving circuit with a receiving coil for the measuring equipment shown in FIG. 1, a preamplifier and an inserted switch.

FIG. 12 shows a second embodiment of the receiving circuit with a receiving switch 21 inserted between the receiving coil and the preamplifier. As it appears from the graphical depiction shown in FIG. 13, the receiving switch can advantageously be activated after the avalanche sequence has ended at the time $t_{contact}$ whereby the harmonic distortion $V_{harmon}$ is dampened considerably, about 80 to 100 dB.

Such a switch 15 will typically be of an electronic type such as transistors or FETs, such as the described MOSFET in the transmitter circuit since mechanical switches typically are too slow for use in the present invention and furthermore will contribute with harmful noise.

Figure 13:
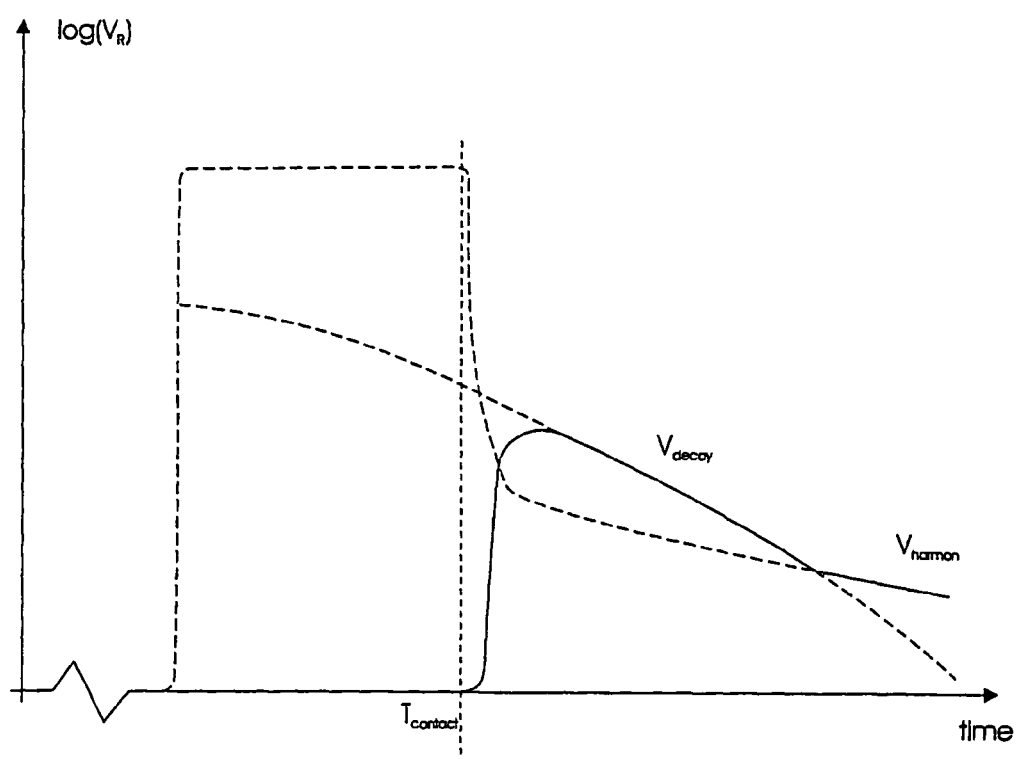
FIG. 13 shows the voltage over the receiving coil shown in FIG. 12 as a function of time.

As it further appears from the example shown in FIG. 13, the insertion of the receiver switch is not always sufficient. The best way possible to avoid that the harmonic distortion interferes with the measurements of the decay signal is often advantageously to combine this solution with the above-described placement of the receiving coil.

To obtain the desired magnetic moment 16 which, as mentioned earlier, is defined by $I_T*A_{transmitter}*n$, it is typically the transmitter current $I_t$ which is the value that can be varied the most. The area $A_{transmitter}$ is limited to the fact that the construction needs to be easy to handle with respect to its size, and just a relatively small-number of turns in the coil quickly results in an unacceptable high self-induction $L_{coil}$, which further leads to the fact that, even at slow decay times, the current of the transmitter coil cannot be cut off fast enough to reliably be able to measure the wanted decay signal.

It is therefore advantageous to use a thick cable which can lead the current with high amperage. The 16 mm soft cored cable 22 shown in FIG. 15a therefore has a solid core 23. Use of such cables with solid cores or several non-insulated cores will however produce the 'thick thread effect' $V_{tt}$ graphically shown in FIG. 14.

Figure 14:
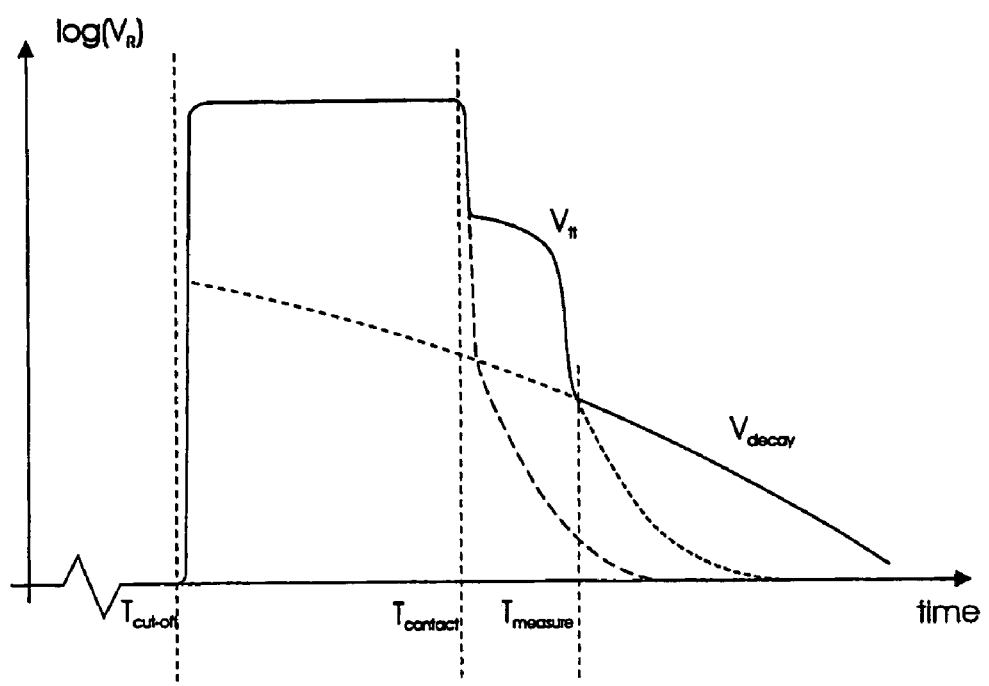
FIG. 14 shows the voltage over the receiving coil shown in FIG. 4 or 12 as a function of time where the transmitter coil is arranged with thick thread effect.
Figure 15A:
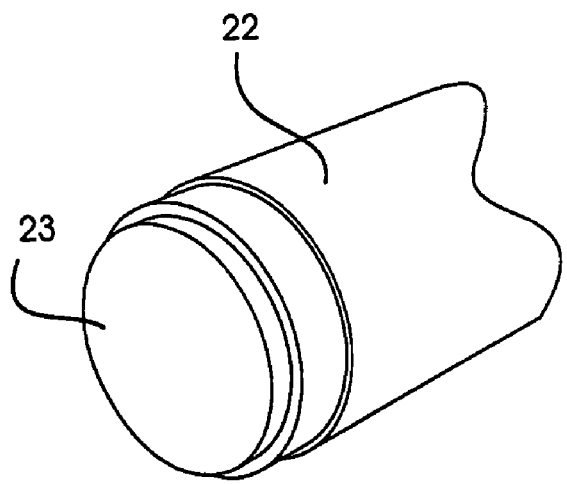
FIG. 15a is on a larger scale a fractional perspective view of a wire with a single core for a transmitter coil.

Transmitter coil 6 induces this thick thread effect in the receiving coil 7 resulting in that the decay signal only can be measured later at the time $t_{measure}$ in FIG. 14 since it is drowned out by the voltage $V_{tt}$ from the thick thread effect.

Figure 15B:
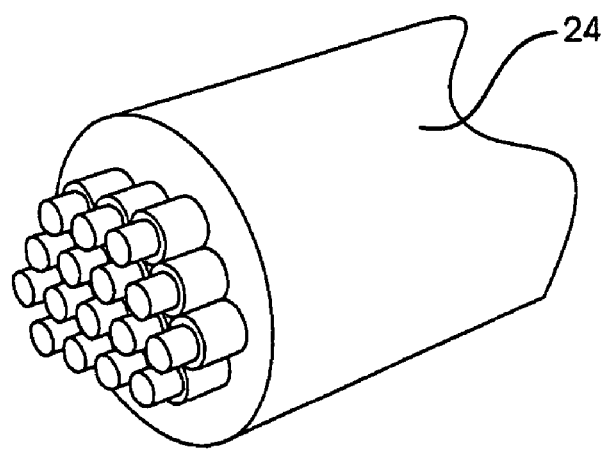
FIG. 15b shows same wire but with the current conducting area separated into several electrical cores.

Instead, the thick thread effect can however be reduced considerably by using the cable 24 shown in FIG. 15b having 16 1 mm insulated cores.

Figure 15C:
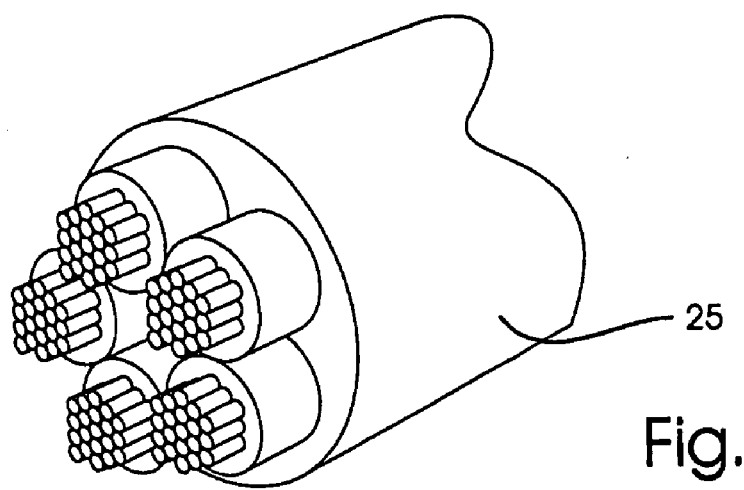
FIG. 15c shows same wire but with the current conducting area separated into even more electrical insulated cores.

An even better result is obtained by using the cable 25 shown in FIG. 15c with five insulated bundles of 20 0.16 mm$^2$ cores, whereby the thick thread effect is removed to such an extent that it is not an inconvenience to the measurements.

As it appears, it is important to be able to turn off the transmitting current quickly. Thus the time when the avalanche sequence is present is reduced and thereby the time when this signal drowns the decay signal in the receiving coil.

The factors which decide the length of the avalanche sequence is the size of the transmitting current, the avalanche voltage and the self-induction of the transmitter coil.

If the desired data quality is to be obtained, it is necessary that the magnetic moment should not be lowered. On the contrary it is most often desirable to increase it.

Since the transmitting moment is decided by $I_T*A_{transmitter}*n$, the factors which can lower the cut-off time will be lower current, less self-induction and higher cut-off voltage.

If the magnetic moment must remain unchanged, the current amperage can only be decreased if the area is increased and/or the number of turns is increased. Due to logistical reasons it is hard to increase the area considerably since the transmitter coil then would become difficult to handle. If the number of turns is increased instead, the self-induction is increased. This solution is therefore not expedient, especially since the self-induction of a coil is proportional with the number of turns squared. A doubling of the number of turns therefore leads to a quadrupling of the self-induction. The self-induction can however be reduced to a lesser degree by spreading the coil. It is however only minimal improvements that can be obtained in this manner.

Since no MOSFETS, which can handle a large current along with a high cut-off voltage, are currently marketed, a solution of above-mentioned problem cannot presently be found in this manner.

Switch transistors of the IGBT type can however be used which can handle a considerable higher cut-off voltage. These transistors must be protected externally by avalanche diodes or other protection circuitry since they do not, as the MOSFET technology, have avalanche diodes as a part of their internal structure. However, IGBT switch transistors have a considerable "tail current" which still runs in the switch after this has been turned off and thereby creates a magnetic field in the transmitter coil which will distort the measurement of the decay signal in the receiving coil.

The earlier described technique for minimizing the influence from leakage currents in the transmitter coil can advantageously be used in this case since tail currents run in the transmitter coil and power from these could be minimized just as the effect of leakage currents by placing the receiving coil horizontally in the zero area.

A simple and advantageous method according to the invention for reducing the cut-off time consists of using several transmitters each having its own transmitter coil which is turned off separately.

Figure 16:
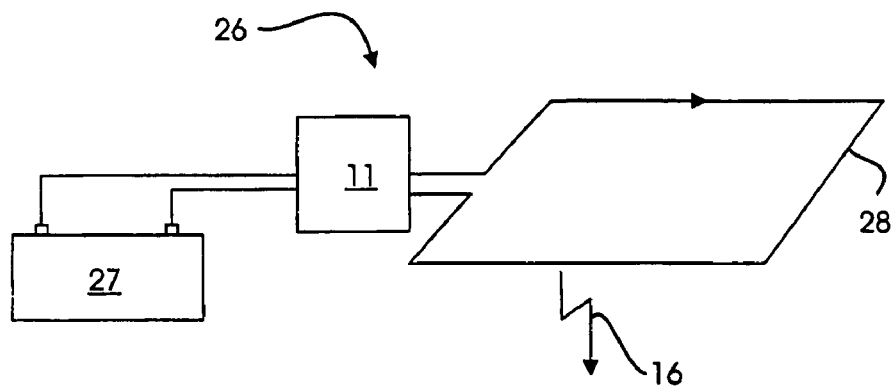
FIG. 16 shows a transmitting circuit for the measuring equipment shown in FIG. 1 with one transmitter coil.

FIG. 16 shows a transmitting arrangement 26 with a 24 Volts battery 27 which sends a transmitting current through the transmitting circuit with amperage of 50 Ampere through a transmitter coil 28 with four turns.

Figure 17:
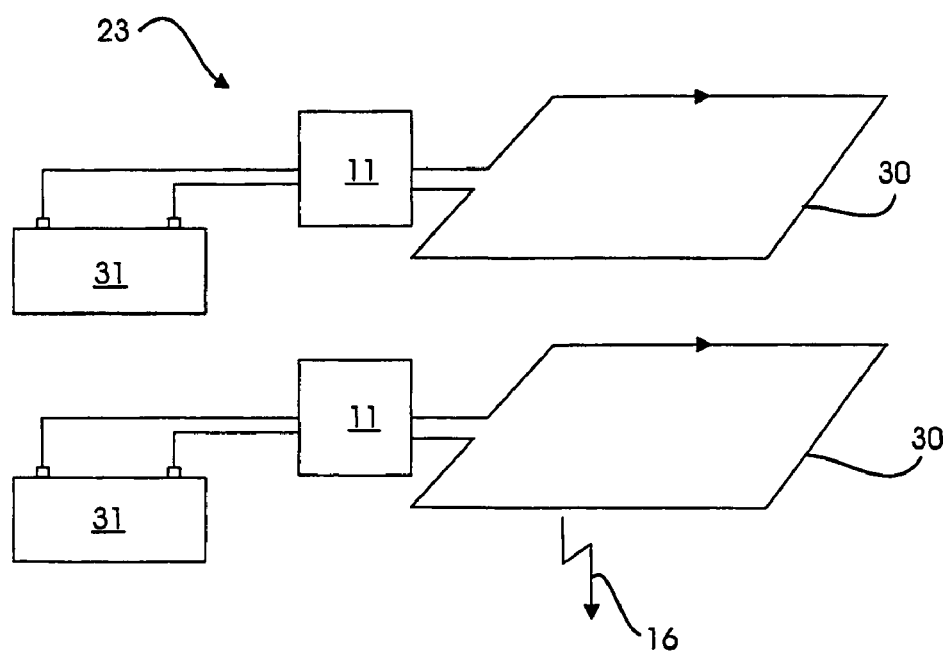
FIG. 17 shows two transmitting circuits for the measuring circuit shown in FIG. 1, each having a transmitter coil which is placed immediately close above each other.

FIG. 17 shows an alternative transmitter arrangement 29 with two transmitter coils 30 which each have two turns placed on top over each other. Advantageously they are placed close and immediately next to each other. A 12 Volts battery 31 sends a transmitter current with amperage of 50 Ampere through each of the transmitter coils 30.

The weight of the two arrangements in FIGS. 16 and 17 respectively is roughly the same since a further transmitter unit 3 is the only extra included in the measuring equipment shown in FIG. 17, is, the weight of which unit is minimal.

The two coils in FIG. 17 are completely coupled. It has proved that self-induction by this arrangement is reduced to half in every transmitter coil because of the close coupling with the second transmitter coil. This means that the cut-off time is reduced to half which is a significant reduction.

A bigger break-up of the transmitter coil turn of course be imagined. For example into 4 coils with one turn each. Thus an even bigger reduction of the cut-off time could be obtained.

Another approach to measure the full time interval from 10 microseconds to 10 milliseconds consists in the fact that a pattern is transmitted in shape of different magnetic moments from the transmitter circuit. Thus the early times can be measured by transmitting a low moment in one to two turns with for example 20 ampere, which quickly is allowed to be cut off. For measurement of the late times, a high moment of for example 50 Ampere in four turns can be transmitted.

Within the scope of the invention magnetic moments in other patterns can of course be used.

The above-described improvements of the conventionally used transient electromagnetic sounding can, within the scope of the invention, be used separately or in advantageous combinations in dependence of how precise the measurements are desired to be and how large a magnetic moment or how small a mechanical construction for carrying the measuring equipment is desired.

What is claimed is:

1. Measuring equipment for mapping the geology in an underground formation, comprising:
   at least one transmitter circuit with at least one transmitter coil and a current source, the transmitter coil including a wire and being located in a plane;
   at least one switch which is inserted between the current source and the at least one transmitter coil and which serves to connect the current source of the at least one transmitter circuit with the at least one transmitter coil during operation thereby generating an electrical current ($I_T$) for building up a magnetic field in the formation and to cut off the electrical current (I) again thereby causing the built up magnetic field in the formation to decay, and
   at least one receiving circuit with at least one receiving coil and being placed in an area where the induction in the receiving coil from the current in the transmitter coil is zero or minimal,
   wherein the at least one receiving coil is located in a plane that is tangential to a field line of the magnetic field, and the receiving coil is located in a plane that is parallel to the plane of the transmitter coil.

2. The measuring equipment according to claim 1, comprising two transmitting circuits.

3. The measuring equipment according to claim 2, wherein the two transmitter coils are placed close to and above each other.

4. The measuring equipment according to claim 1, wherein the wire of the transmitter coil is put together by a number of electrically insulated cores.

5. The measuring equipment according to claim 1, further comprising a receiving unit inserted in the at least one receiving circuit for registering the voltage ($V_{Rcoil}$) which is induced over the receiving coil (7).

6. The measuring equipment according to claim 1, wherein the transmitter coils have a different number of turns.

7. The measuring equipment according to claim 1, wherein the transmitter coils provide applied currents ($I_T$) of different values.

8. The measuring equipment according to claim 1, wherein the transmitter coil has an area of 10×10 m and that the amperage of the electrical current ($I_T$) in the transmitter coil is between 10 and 70 ampere.

9. The measuring equipment according to claim 1, wherein the receiving coil has an area of 50×50 cm.

10. The measuring equipment according to claim 1, further comprising a frame for mounting the at least one transmitter coil and the at least one receiving coil.

11. A method for mapping the geology in an underground formation, which comprises:

building up a magnetic field in the formation by generating an electrical current ($I_T$) in at least one transmitter coil which is placed over the formation, decaying the magnetic field by cutting off the current ($I_T$), and measuring a representation of the decay as voltage ($V_{Rcoil}$) created across a receiving coil during influence from the decay, with the measuring made in an area where the magnetic field strength from the transmitter coil is zero or very small, wherein the measuring is done made when the at least one receiving coil is located in a plane that is tangential to a field line of the magnetic field, and when the receiving coil is located in a plane parallel to the plane of the transmitter coil.

12. The method according to claim 11, wherein at least two transmitter coils are placed above the formation in close proximity and above each other.

13. The method according to claim 12, wherein the transmitter coils provide applied currents ($I_T$) of different values.

14. The method according to claim 11, wherein the transmitter coil has an area of 10×10 m and that the amperage of the electrical current ($I_T$) in the transmitter coil is between 10 and 70 ampere.

15. The method according to claim 11, wherein the receiving coil has an area of 50×50 cm.

* * * * *